United States Patent
Tsuchiya (10) Patent No.: US 10,276,857 B2
(45) Date of Patent: Apr. 30, 2019

(54) METHOD OF MANUFACTURING ELECTRODE FOR SECONDARY BATTERY AND HOT-GAS DRYING FURNACE

(71) Applicant: Kenji Tsuchiya, Toyota (JP)

(72) Inventor: Kenji Tsuchiya, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 252 days.

(21) Appl. No.: 14/430,572

(22) PCT Filed: Sep. 25, 2012

(86) PCT No.: PCT/JP2012/074584
§ 371 (c)(1),
(2) Date: Mar. 24, 2015

(87) PCT Pub. No.: WO2014/049692
PCT Pub. Date: Apr. 3, 2014

(65) Prior Publication Data
US 2015/0255780 A1    Sep. 10, 2015

(51) Int. Cl.
*H01M 4/04* (2006.01)
*F26B 13/10* (2006.01)
(Continued)

(52) U.S. Cl.
CPC ............ *H01M 4/0471* (2013.01); *F26B 3/02* (2013.01); *F26B 13/10* (2013.01); *F26B 13/108* (2013.01);
(Continued)

(58) Field of Classification Search
CPC ..... H01M 4/0471; F26B 13/10; F26B 13/108; F26B 21/004; F26B 21/10; F26B 3/02
(Continued)

(56) References Cited

U.S. PATENT DOCUMENTS

| 3,707,777 A * | 1/1973 | Geyken ............ G03D 15/022 219/388 |
| 2010/0058609 A1 * | 3/2010 | Taguchi ............ B41C 1/1083 34/443 |
| 2010/0247759 A1 * | 9/2010 | Hayashi ............ B05D 7/534 427/162 |

FOREIGN PATENT DOCUMENTS

| JP | 2003-294364 A | 10/2003 |
| JP | 2004-71472 A | 3/2004 |

(Continued)

OTHER PUBLICATIONS

Eastman product sheet, N-Methyl-2-Pyrrolidone, retrieved from http://www.eastman.com/Products/Pages/ProductHome.aspx?Product=71103627 (Year: 2017).*

*Primary Examiner* — Dah-Wei D. Yuan
*Assistant Examiner* — Jose Hernandez-Diaz
(74) *Attorney, Agent, or Firm* — Sughrue Mion, PLLC (57) ABSTRACT

Provided are a method of manufacturing an electrode for a secondary battery which can properly maintain the temperature of a hot gas while requiring a smaller amount of hot gas, and a hot-gas drying furnace used for the method. A control device calculates an amount of decrease in temperature of a hot gas at a blowing position of a nozzle (first position) based on a temperature of the hot gas at second position situated downstream of the first position and a temperature of the hot gas at third position situated downstream of the second position. The control device adds the amount to a set temperature of the hot gas at the first position to calculate a modified set temperature. The control device adjusts an output of a heater depending on a difference between the modified set temperature and the temperature at the first position.

3 Claims, 8 Drawing Sheets

(51) Int. Cl.
*F26B 3/02* (2006.01)
*F26B 21/00* (2006.01)
*F26B 21/10* (2006.01)

(52) U.S. Cl.
CPC ............ *F26B 21/004* (2013.01); *F26B 21/10* (2013.01); *H01M 4/0404* (2013.01)

(58) Field of Classification Search
USPC .......... 34/421–422, 424, 445–446, 493, 495; 427/8–10; 118/58, 65
See application file for complete search history.

(56) References Cited

FOREIGN PATENT DOCUMENTS

| | | | |
|---|---|---|---|
| JP | 2010-203751 A | | 9/2010 |
| JP | 2010-210231 A | | 9/2010 |
| KR | 10-2012-0057437 A | | 6/2012 |
| KR | 20120057437 A | * | 6/2012 |

* cited by examiner

FIG. 1    Step for manufacturing electrode

| | | \multicolumn{11}{c}{$T_C$(°C)} |
|---|---|---|---|---|---|---|---|---|---|---|---|---|
| | | 50 | 60 | 70 | 80 | 90 | 100 | 110 | 120 | 130 | 140 | 150 |
| $T_B$(°C) | 50 | 100 | | | | | | | | | | |
| | 60 | 80 | 90 | | | | | | | | | |
| | 70 | 64 | 70 | 80 | | | | | | | | |
| | 80 | 54 | 60 | 65 | 70 | | Amount of decrease in temperature at point A | | | | | |
| | 90 | 42 | 46 | 50 | 55 | 60 | | | | | | |
| | 100 | 31 | 35 | 39 | 43 | 46 | 50 | | | | | |
| | 110 | 22 | 26 | 29 | 32 | 34 | 37 | 40 | | | | |
| | 120 | 12 | 13 | 15 | 18 | 21 | 24 | 27 | 30 | | | |
| | 130 | 4 | 6 | 8 | 10 | 12 | 14 | 16 | 18 | 20 | | |
| | 140 | 1 | 2 | 3 | 4 | 5 | 6 | 7 | 8 | 9 | 10 | |
| | 150 | 0 | 0 | 0 | 0 | 0 | 0 | 0 | 0 | 0 | 0 | 0 |

| Sample No. | Moisture content (ppm) | |
|---|---|---|
| | Prior art 25CMM | Present invention 22.5CMM |
| 1 | 345 | 361 |
| 2 | 352 | 362 |
| 3 | 372 | 338 |
| 4 | 342 | 342 |
| 5 | 374 | 345 |
| 6 | 354 | 376 |
| 7 | 372 | 341 |
| 8 | 324 | 354 |
| Average | 354 | 352 |

METHOD OF MANUFACTURING ELECTRODE FOR SECONDARY BATTERY AND HOT-GAS DRYING FURNACE

CROSS REFERENCE TO RELATED APPLICATIONS

This application is a National Stage of International Application No. PCT/JP2012/074584 filed Sep. 25, 2012, the contents of which are incorporated herein by reference in their entirety.

TECHNICAL FIELD

The present invention relates to a technique on a method of manufacturing an electrode for a secondary battery and a hot-gas drying furnace used for the method.

BACKGROUND ART

A step of manufacturing an electrode which constitutes a secondary battery includes a step of applying a paste for the electrode on the surface of a collector sheet, and a step of drying the paste (i.e., removing a solvent). A hot-gas drying furnace is generally used for drying the paste.

The step of drying the paste using the hot-gas drying furnace is roughly as follows: a collector sheet having a surface to which the paste is applied is conveyed into the hot-gas drying furnace by web handling. Then, a hot gas is blown onto the paste on the collector sheet through a nozzle inside the hot-gas drying furnace, and thereby a solvent (e.g., NMP (N-methyl pyrolidone), or water) contained in the paste is evaporated to remove the solvent.

The term "remove" as used herein includes reducing a residual amount of a solvent to a predetermined standard value or less, and does not mean only removing a solvent completely.

It has been known that, in the case of drying the paste using the hot-gas drying furnace in this manner, the temperature of a hot gas is reduced by evaporative latent heat generated when a solvent is evaporated.

In an electrode for a secondary battery, a standard value regarding a residual amount of a solvent after drying is set. However, it has been known that the residual amount is increased when the temperature of the hot gas decreases.

In a conventional hot-gas drying furnace, the amount of a hot gas is increased to limit an influence of decrease in the temperature caused by evaporative latent heat, thus ensuring a drying condition where a residual amount of a solvent becomes equal to or smaller than a standard value.

However, when the amount of a hot gas (i.e., the amount of introduced outside gas) in the hot-gas drying furnace is increased, it is also necessary to increase the amount of a hot gas to be discharged from the hot-gas drying furnace.

The increase in the amount of introduced outside gas directly affects the increase in an air conditioning load in an area where the hot-gas drying furnace is installed. Therefore, conventionally, a running cost of the hot-gas drying furnace is excessively high and this increase in the running cost is a factor in an impediment to the reduction in a cost of a secondary battery.

In view of the above, various studies on a technique for reducing the amount of hot gas in a hot-gas drying furnace have been made. For example, the technique disclosed in the following Patent Literature 1 has been publicly known.

In the prior art disclosed in Patent Literature 1, in a drying step which is performed after applying a paste for an electrode, the temperature of a hot gas is adjusted in consideration of the amount of decrease in temperature caused by evaporative latent heat in order to offset the amount of decrease in temperature caused by the evaporative latent heat. Thereby, the amount of the hot gas is reduced while preventing the temperature from exceeding an allowable upper-limit temperature of a workpiece.

CITATION LIST

Patent Literature

Patent Literature 1: JP-A 2010-210231

SUMMARY OF INVENTION

Problem to be Solved by the Invention

A binder contained in a material for an electrode of a lithium ion secondary battery or the like is a resin component. Accordingly, the binder has the property of being solidified when the temperature of a hot gas exceeds a predetermined temperature. The solidifying of the binder gives rise to the increase in a battery resistance of the secondary battery.

In the prior art disclosed in Patent Literature 1, a heat capacity of the paste is small. Accordingly, at timing where an evaporating amount of a solvent is small, such as an initial stage of a drying step, a range where the temperature is decreased by evaporative latent heat becomes small thus giving rise to a case where the temperature of a hot gas exceeds a temperature at which the binder is solidified.

On the other hand, if the temperature of a hot gas is reduced for preventing the binder from being solidified, it takes time to decrease a residual amount of a solvent to an amount equal to or smaller than a predetermined standard value (i.e., drying efficiency is reduced).

In other words, conventionally, in an attempt to decrease the amount of a hot gas in a hot-gas drying furnace, it is difficult to ensure drying efficiency while reliably adjusting the temperature of a hot gas to a predetermined temperature or less.

The present invention has been made in view of the above-mentioned problem. The object of the present invention is to provide a method of manufacturing an electrode for a secondary battery which can properly maintain the temperature of a hot gas while requiring a smaller amount of hot gas compared to the prior art in order to reduce a cost of a secondary battery, and a hot-gas drying furnace used for the method.

Means for Solving the Problem

The problem to be solved by the present invention is as described above, and the means for solving the problem is described below.

A first aspect of the invention is a method of manufacturing an electrode for a secondary battery using a hot-gas drying furnace. The hot-gas drying furnace includes a conveying roller for conveying a collector sheet to which a paste for the electrode is applied, a nozzle for blowing a hot gas which is a heated gas onto the paste, a gas supply fan and a gas supply duct for supplying the hot gas to the nozzle, a heater for heating the gas to be supplied to the nozzle, which is disposed in the gas supply duct, a control device for adjusting an output of the heater, a gas exhaust fan and a gas exhaust duct for discharging the hot gas after being blown onto the paste, and first, second and third temperature sensors. The method includes a step of measuring, using the first temperature sensor, a temperature of the hot gas at a first position which is a blowing position of the nozzle, a step of measuring, using the second temperature sensor, a temperature of the hot gas at a second position which is a flow area of the hot gas blown through the nozzle, the second position being situated downstream of the first position in a flow direction of the hot gas blown through the nozzle, a step of measuring, using the third temperature sensor, a temperature of the hot gas at a third position which is a flow area of the hot gas blown through the nozzle, the third position being situated downstream of the second position in the flow direction of the hot gas blown through the nozzle, a step of calculating, using the control device, an amount of decrease in temperature of the hot gas at the first position caused by evaporative latent heat of the paste based on the temperature of the hot gas measured by the second temperature sensor and the temperature of the hot gas measured by the third temperature sensor, a step of adding, using the control device, the calculated amount to a set temperature of the hot gas at the first position to modify the set temperature of the hot gas at the first position, and a step of adjusting, using the control device, the output of the heater depending on a difference between the modified set temperature of the hot gas and the temperature of the hot gas measured by the first temperature sensor.

Preferably, the control device has map information on a correlation acquired in advance between the amount of decrease in temperature of the hot gas at the first position caused by the evaporative latent heat of the paste, and the temperature of the hot gas at the second position and the temperature of the hot gas at the third position. The control device calculates, using the map information, the amount of decrease in temperature of the hot gas at the first position based on the temperature of the hot gas at the second position measured by the second temperature sensor and the temperature of the hot gas at the third position measured by the third temperature sensor.

A second aspect of the invention is a hot-gas drying furnace including a conveying roller for conveying, by web handling, a collector sheet to which a paste for an electrode is applied, a nozzle for emitting a hot gas which is a heated gas to be blown onto the paste, a gas supply fan and a gas supply duct for supplying the hot gas to the nozzle, a heater for heating the gas to be supplied to the nozzle, which is disposed in the gas supply duct, a control device for adjusting an output of the heater, a gas exhaust fan and a gas exhaust duct for discharging the hot gas emitted through the nozzle, a first temperature sensor for detecting a temperature of the hot gas at a first position which is a blowing position of the nozzle, a second temperature sensor for detecting a temperature of the hot gas at a second position which is a flow area of the hot gas emitted through the nozzle, the second position being situated downstream of the first position in the flow direction of the hot gas emitted through the nozzle, and a third temperature sensor for detecting a temperature of the hot gas at a third position which is a flow area of the hot gas emitted through the nozzle, the third position being situated downstream of the second position in the flow direction of the hot gas emitted through the nozzle. The control device is connected to the first, second and third temperature sensors. The control device has map information on a correlation acquired in advance between an amount of decrease in temperature of the hot gas at the first position caused by evaporative latent heat of the paste, and the temperature of the hot gas at the second position and the temperature of the hot gas at the third position. The control device calculates, using the map information, the amount of decrease in temperature of the hot gas at the first position based on the temperature of the hot gas measured by the second temperature sensor and the temperature of the hot gas measured by the third temperature sensor. The control device adds the amount of decrease in temperature of the hot gas at the first position to a set temperature of the hot gas at the first position to modify the set temperature of the hot gas at the first position. The control device adjusts the output of the heater depending on a difference between the modified set temperature of the hot gas and the temperature of the hot gas measured by the first temperature sensor in order to control the temperature of the hot gas at the first position.

Effects of the Invention

The following advantageous effects can be acquired as advantageous effects of the present invention.

According to first and second aspects of the invention, it is possible to reliably prevent the temperature of a hot gas from exceeding an allowable upper-limit temperature of a workpiece while reducing the amount of a hot gas for drying a paste for an electrode.

Accordingly, a cost required to manufacture a secondary battery can be reduced while reducing an air conditioning load.

BRIEF DESCRIPTION OF DRAWINGS

FIG. 3($a$) and FIG. 3($b$) are schematic views showing the flow of a hot gas in the hot-gas drying furnace according to the first embodiment of the present invention, in which FIG. 3($a$) is a perspective schematic view, and FIG. 3($b$) is a partially enlarged schematic view of a structure around nozzles.

FIG. 5($a$) and FIG. 5($b$) are flowcharts regarding control of the hot-gas drying furnace, in which FIG. 5($a$) is a flowchart of the hot-gas drying furnace according to one embodiment of the present invention, and FIG. 5($b$) is a flowchart of a conventional hot-gas drying furnace.

FIG. 7($a$) and FIG. 7($b$) are schematic views showing the flow of a hot gas in the hot-gas drying furnace according to the second embodiment of the present invention, in which FIG. 7($a$) is a perspective schematic view, and FIG. 7($b$) is a partially enlarged schematic view of a structure around nozzles.

DESCRIPTION OF EMBODIMENTS

Embodiments of the present invention are described.

First, the summary of a step of manufacturing a secondary battery is described with reference to FIG. 1.

Figure 1:
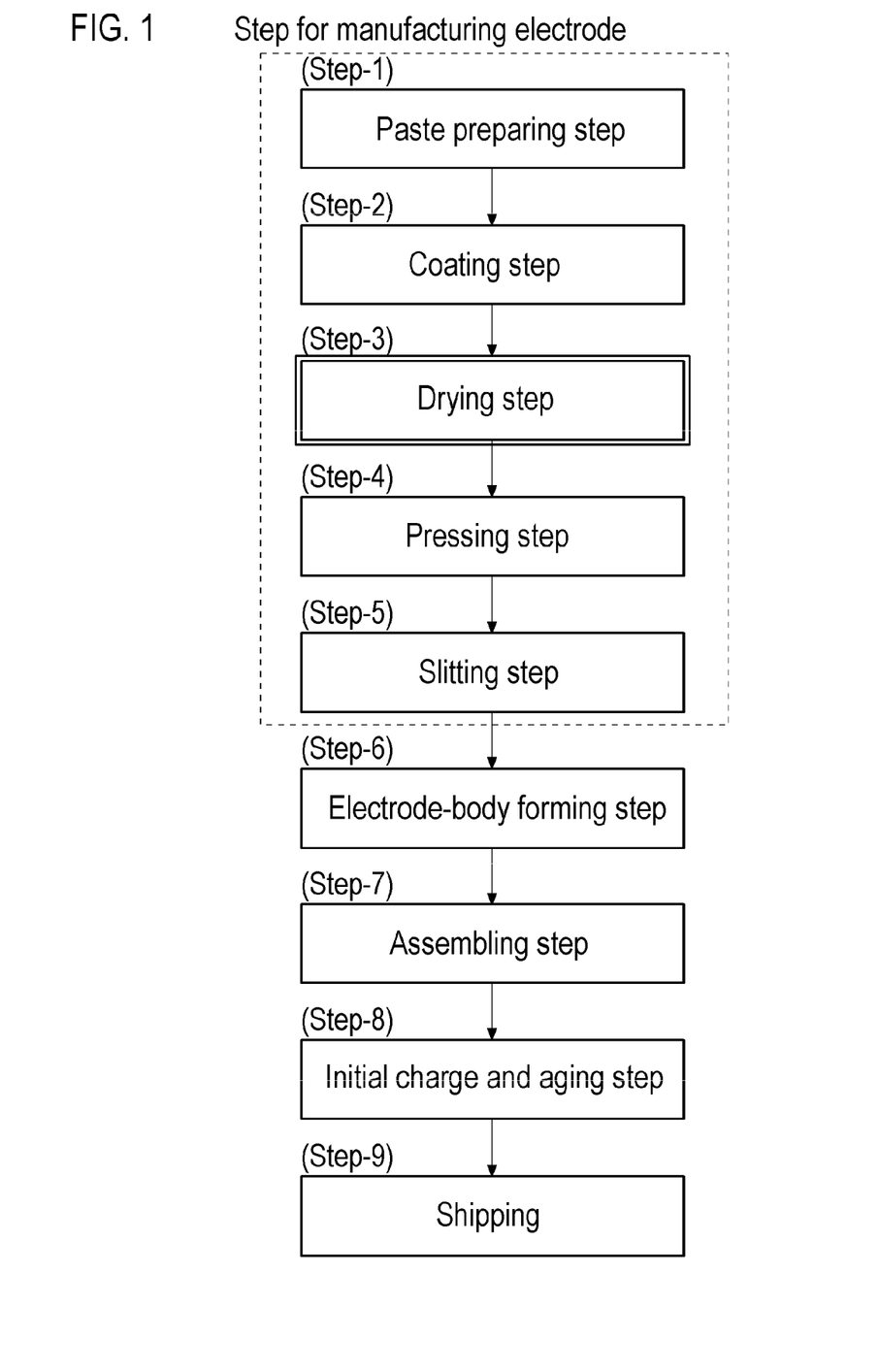
FIG. 1 is a flowchart showing the flow of a method of manufacturing a secondary battery according to one embodiment of the present invention.

The step of manufacturing the secondary battery is performed in accordance with the flow shown in FIG. 1.

Specifically, the secondary battery is manufactured through a paste preparing step (Step-1), a coating step (Step-2), a drying step (Step-3), a slitting step (Step-4), a pressing step (Step-5), an electrode-body forming step (Step-6), an assembling step (Step-7), and an initial charge and aging step (Step-8) and, thereafter, is shipped (Step-9).

The paste preparing step (Step-1) is a step where a paste for manufacturing a positive electrode or a negative electrode (a paste for an electrode) is prepared.

The paste for a positive electrode is produced by mixing, for example, lithium nickel manganese cobalt oxide which is a positive electrode active substance, acetylene black which is a conductor, and PVDF which is a binder together with a solvent (for example, NMP) and by performing dilution and the like.

On the other hand, the paste for a negative electrode is formed by mixing, for example, graphite which is a negative electrode active substance, CMC which is a thickening agent, SBR which is a binder together with a solvent (for example, water) and by performing dilution and the like.

The coating step (Step-2) is a step where the paste for a positive or negative electrode formed by the paste preparing step (Step-1) is applied to a surface of a collector sheet. For example, the paste is applied to a surface of the collector sheet with a predetermined coating weight using a device such as a dye coater.

The drying step (Step-3) is a step of forming a laminated layer by drying the paste applied to the surface of the collector sheet. To describe in greater detail, the drying step (Step-3) is a step of reducing a residual amount of a solvent in the laminated layer to a predetermined standard value or less by evaporating a solvent (NMP, water or the like) contained in the paste by heating.

The drying step (Step-3) is performed using a hot-gas drying furnace in this embodiment.

The pressing step (Step-4) is a step of pressing the laminated layer formed through the drying step (Step-3) together with the collector sheet thus increasing the density of the laminated layer to a predetermined density.

The slitting step (Step-5) is a step of cutting the collector sheet and the laminated layer continuously formed in the length direction at a predetermined length and at a predetermined width suitable for forming an electrode body.

The above-mentioned steps (Step-1 to Step-5) constitutes a step (electrode manufacturing step) of manufacturing electrodes (positive electrode and negative electrode) for a secondary battery, and the electrode body is formed by laminating the positive electrode and the negative electrode manufactured by these steps, and a separator manufactured separately, and by winding the laminated members (Step-6).

Next, terminals are attached to the electrode body, and the electrode body is sealed in a case together with an electrolytic solution thus assembling a secondary battery (Step-7).

Then, an initial charge is applied to the assembled secondary battery, and predetermined aging treatment or the like is applied to the secondary battery (Step-8) and, thereafter, the secondary battery is shipped to a market (Step-9).

The step of manufacturing the secondary battery include, in addition to the steps (Step-1 to Step-9) shown in FIG. 1, various other steps such as a step of manufacturing a separator and a step of manufacturing a case. However, for the sake of facilitating the description of the present invention, the description of such steps is omitted.

The method of manufacturing an electrode for a secondary battery according to one embodiment of the present invention is a manufacturing method relating to the drying step (Step-3) in the above-mentioned electrode manufacturing step, and the hot-gas drying furnace according to one embodiment of the present invention is used for realizing the manufacturing method in the drying step (Step-3).

Next, the overall structure of the hot-gas drying furnace according to the first embodiment of the present invention is described with reference to FIG. 2, FIG. 5(a), and FIG. 5(b).

Figure 2:
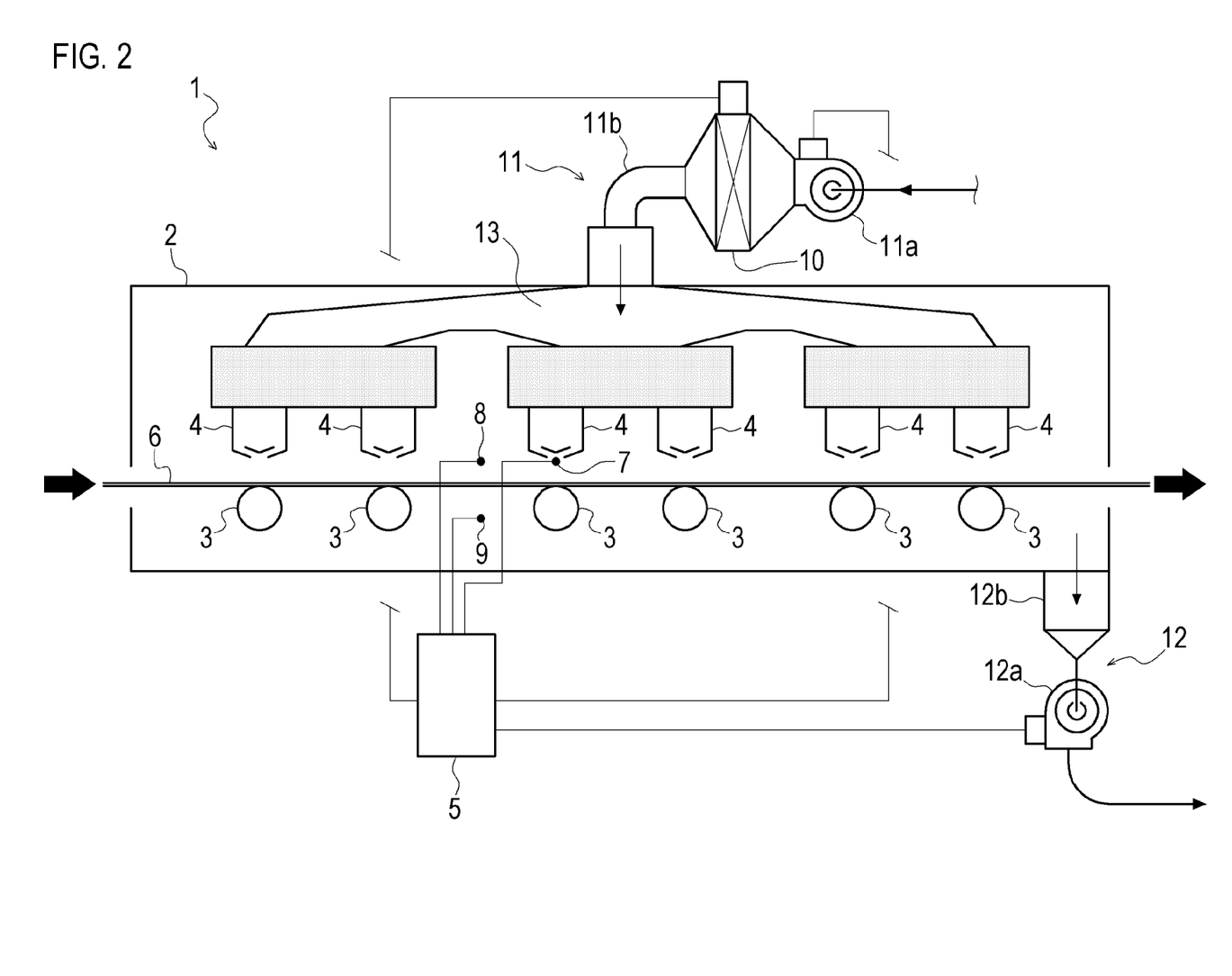
FIG. 2 is a schematic view showing the overall structure of an apparatus (hot-gas drying furnace) for manufacturing an electrode for a secondary battery according to a first embodiment of the present invention.

As shown in FIG. 2, the hot-gas drying furnace 1 according to the first embodiment of the present invention is an apparatus used in the drying step (see FIG. 1) in the step of manufacturing the electrode for the secondary battery, and includes a furnace body 2, a plurality of conveying rollers 3, a plurality of nozzles 4, a control device 5, and temperature sensors 7, 8 and 9.

Figure 3A:
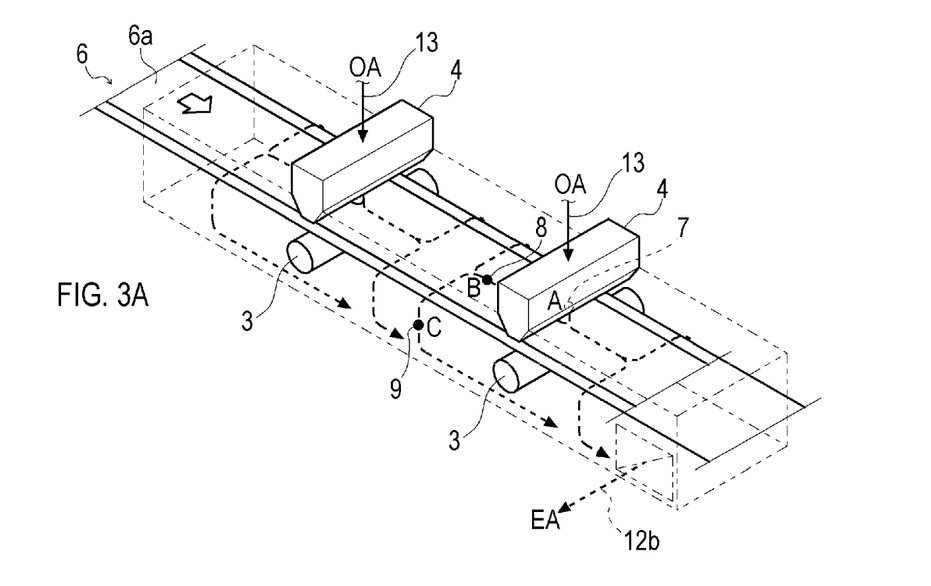

As shown in FIG. 3(a), to a surface of the collector sheet 6 which is a workpiece introduced into the hot-gas drying furnace 1, a paste 6a for the electrode is applied with a predetermined width so that the paste 6a is formed continuously in the length direction of the collector sheet 6.

Figure 3B:
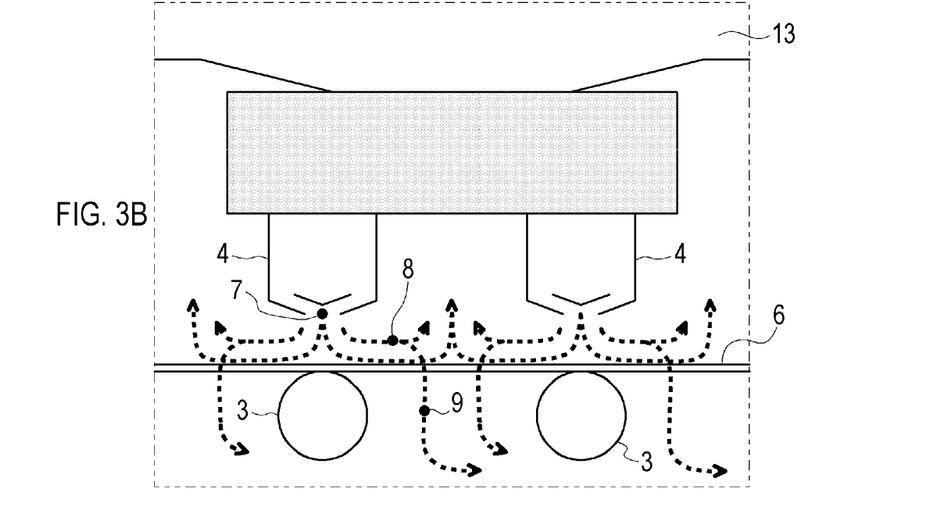

As shown in FIG. 3(a) and FIG. 3(b), the nozzle 4 is configured to emit a hot gas in two directions, namely, in the direction toward an upstream side and in the direction toward a downstream side with respect to the conveyance direction of the collector sheet 6 in the hot-gas drying furnace 1.

As shown in FIG. 2, the control device 5 is a device for controlling the temperature of a hot gas emitted through the nozzle 4 so as to adjust a drying state of the paste 6a (see FIG. 3(a)) on the collector sheet 6 introduced into the hot-gas drying furnace 1.

The control device 5 is connected to a plurality of (three systems) temperature sensors 7, 8 and 9 and is configured so that the result of measurement of temperatures detected by the temperature sensors 7, 8 and 9 is inputted to the control device 5.

The hot-gas drying furnace 1 includes a gas supply device 11 for supplying a gas to the nozzles 4, and a gas exhaust device 12 for discharging the gas supplied from the gas supply device 11 from the hot-gas drying furnace 1.

In this embodiment, the hot-gas drying furnace 1 is configured to use air (outside air) as "gas" to be supplied to the nozzles 4.

In the hot-gas drying furnace 1, "gas" supplied to the nozzles 4 is not limited to air, and "gas" other than air such as an inert gas can be also adopted, for example.

The gas supply device 11 includes a gas supply fan 11a and a gas supply duct 11b, and a heater 10 for heating a gas (air in this embodiment) to be supplied to the hot-gas drying furnace 1 is provided in the gas supply duct 11b.

Hereinafter, a gas (air in this embodiment) which is supplied by the gas supply device 11 and is heated by the heater 10 is referred to as "hot gas".

The gas supply duct 11b of the gas supply device 11 is connected to a branching duct 13 disposed in the inside of the furnace body 2, and a hot gas supplied by the gas supply device 11 is distributed to the nozzles 4 by the branching duct 13.

The gas exhaust device 12 includes a gas exhaust fan 12a and a gas exhaust duct 12b. The gas exhaust device 12 is connected to the furnace body 2, and discharges a hot gas supplied to the furnace body 2 to the outside of the furnace body 2 through the gas exhaust duct 12b.

The heater 10 is connected to the control device 5, and is configured to adjust an output of the heater 10 in response to a signal output from the control device 5.

The gas supply fan 11a and the gas exhaust fan 12a are connected to the control device 5. These fans 11a and 12a are configured to adjust amounts of gas moved by the fans 11a and 12a by changing fan rotational speeds (specifically, set frequencies of inverters with which the respective fans 11a and 12a are provided) of the fans 11a and 12a in response to a signal output from the control device 5.

The paste 6a is applied to a surface of the collector sheet 6 conveyed by the plurality of conveying rollers 3 by web handling in the coating step (Step-2). While being conveyed by the conveying rollers 3 in the inside of the furnace body 2, a hot gas emitted through the plurality of nozzles 4 is brown out onto the paste 6a on the collector sheet 6.

In the hot-gas drying furnace 1, a plurality of (three in this embodiment) temperature sensors 7, 8 and 9 are disposed at positions along the flow of a hot gas brown out through the nozzles 4.

The positions where the temperature sensors 7, 8 and 9 are disposed are described with reference to FIG. 3(a) and FIG. 3(b).

As shown in FIG. 3(a) and FIG. 3(b), the hot gas emitted through the nozzle 4 flows along the surface of the collector sheet 6 (i.e., the paste 6a) and, thereafter, part of the hot gas flows in a turning-around-manner toward a backside of the collector sheet 6 and, thereafter, the hot gas flows in the direction toward an end of the hot-gas drying furnace 1 where the gas exhaust duct 12b is connected.

Other part of the hot gas which flows along the surface of the collector sheet 6 (i.e., the paste 6a) flows in such a manner that the hot gas collides with a hot gas emitted through another nozzle 4 disposed adjacent to the nozzle 4 and whirls and hence, there are places in the inside of the furnace body 2 where hot gas is formed into a turbulent flow.

The hot-gas drying furnace 1 is configured so that a hot gas is distributed into the plurality of nozzles 4 by the branching duct 13 disposed in the inside of the furnace body 1. Among the nozzles 4, a hot gas of higher temperature is blown through the nozzle 4 having a shorter flow passage length from the heater 10.

In the hot-gas drying furnace 1, the nozzle 4 having the shortest flow passage length from the heater 10 is selected, and the temperature sensors 7, 8 and 9 are disposed along the flow of a hot gas blown through the nozzle 4.

By adjusting the temperature of a hot gas blown through the nozzle 4 having the shortest flow passage length from the heater 10 to a predetermined temperature or below, the temperature of a hot gas over the entire hot-gas drying furnace 1 is adjusted to a temperature below a temperature at which curing of the laminated layer is not generated.

In the hot-gas drying furnace 1, with respect to the nozzles 4 other than the nozzle 4 which is an object whose temperature is detected by a temperature sensor 7, temperature of a hot gas emitted through these nozzles 4 is set according to the situation.

Among the plurality of temperature sensors 7, 8 and 9, the first temperature sensor 7 is disposed just below the nozzle 4, namely, at a point A situated at the outlet of the nozzle 4. The temperature sensor 7 is configured to measure a temperature $T_A$ of a hot gas at the point A.

A target temperature of a hot gas at the point A is defined as a set temperature $T_S$, and an output of the heater 10 (see FIG. 2) is adjusted by the control device 5 (see FIG. 2) so that the temperature of a hot gas blown through the nozzle 4 agrees with the set temperature $T_S$ at the point A.

The temperature $T_A$ of a hot gas at the point A is lower than the temperature of the hot gas immediately before the hot gas is blown by being influenced by evaporative latent heat of the paste 6a.

Specifically, the point A in the hot-gas drying furnace 1 is disposed at a position 5 mm above the collector sheet 6, and the set temperature Ts of a hot gas at the point A is set to 150° C. (Ts=150° C.).

In other words, the height of the blowing position at a lower surface of the nozzle 4 is set as the height of the position 5 mm above the collector sheet 6.

The second temperature sensor 8 is disposed at a point B situated downstream of the point A where the first temperature sensor 7 is disposed in the flow direction of a hot gas emitted through the nozzle 4. A temperature $T_B$ of the hot gas at the point B is measured by the temperature sensor 8.

The point B is selectively set at the position where a hot gas flows in a laminar state upstream of a portion in the flow direction of the hot gas where hot gasses emitted through the nozzles 4 collide with each other by avoiding a portion where the flow of the hot gas is formed into a turbulent flow by being influenced by the hot gas emitted through another nozzle 4 or the like.

The temperature $T_B$ of the hot gas at the point B is lower than the temperature $T_A$ since the hot gas is more influenced by evaporative latent heat of the paste 6a at the point B than at the point A during a period that the hot gas flows along the collector sheet 6.

Specifically, the point B in the hot-gas drying furnace 1 is disposed at a position where a length of a flow passage of a hot gas is 200 mm toward a downstream side from the point A in the flow direction of the hot gas, and is also disposed at a position 10 mm above the collector sheet 6.

The third temperature sensor 9 is disposed at a point C situated downstream of the point B where the second temperature sensor 8 is disposed in the flow direction of the hot gas emitted through the nozzle 4. A temperature $T_C$ of the hot gas at the point C is measured by the temperature sensor 9.

The point C is selectively set at the position where the hot gas flows in a laminar state upstream of a portion in the flow direction of the hot gas where hot gasses emitted through the nozzles 4 merge with each other by avoiding a portion where the flow of the hot gas is formed into a turbulent flow by being influenced by the hot gas emitted through another nozzle 4 or the like.

The temperature $T_C$ of the hot gas at the point C is lower than the temperature $T_B$ since the hot gas is more influenced by evaporative latent heat of the paste 6a at the point C than at the point B during a period that the hot gas flows along the collector sheet 6.

Specifically, the point C in the hot-gas drying furnace 1 is disposed at a position where a length of a flow passage of a hot gas is 500 mm toward a downstream side from the point A in the flow direction of the hot gas, and is also disposed at a position 30 mm below the collector sheet 6.

At the point A just below the nozzle 4, the temperature of a hot gas is reduced by being influenced by evaporative latent heat of the paste 6a. However, the amount of decrease in temperature is extremely small. Therefore, it is difficult to detect such extremely small decrease in temperature with high accuracy using the temperature sensor 7 disposed at the point A.

On the other hand, a cross-sectional area of the flow passage at each of the points B and C where the temperature $T_B$ and the temperature $T_C$ are measured becomes larger than that at the point A, thereby a flow rate of a hot gas at each of the points B and C being reduced. Therefore, the measurement of the temperature can be performed in a stable manner with respect to the temperature $T_B$ and the temperature $T_C$ compared to the temperature $T_A$ accompanied by an extremely small temperature variation. Further, a change amount of the temperature $T_B$ and the temperature $T_C$ is large. Therefore, it is possible to easily ensure the temperature detection accuracy.

Accordingly, in the hot-gas drying furnace 1 according to the first embodiment of the present invention, an amount dT of decrease in the temperature of the hot gas at the point A can be calculated with high accuracy based on the temperatures $T_B$ and $T_C$ of the hot gas detected at positions (point B and point C) downstream of the point A in the flow direction of the hot gas, thus enabling to improve the detection accuracy of the amount dT.

Further, in the method of manufacturing an electrode for a secondary battery according to one embodiment of the present invention, the amount dT is calculated based on the correlation between temperatures (temperature $T_B$ and temperature $T_C$) of a hot gas at the point B and the point C downstream of the point A.

Figure 4:
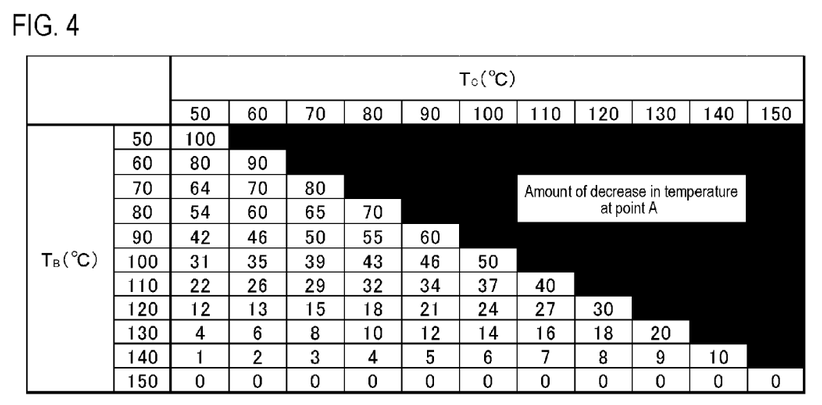
FIG. 4 shows one example of map information used in the hot-gas drying furnace according to the first embodiment of the present invention.

Specifically, in the method of manufacturing an electrode for a secondary battery according to one embodiment of the present invention, the correlation between the temperature $T_B$ and the temperature $T_C$ and the amount dT at the point A is acquired in advance as map information shown in FIG. 4 by experiments or the like.

The amount dT is calculated based on the measured temperature $T_B$ and temperature $T_C$ using the map information.

For example, based on the map information shown in FIG. 4, when the temperature $T_B$ of a hot gas at the point B is 130° C. and the temperature Tc of the hot gas at the point C is 120° C., the amount dT at the point A can be easily calculated as 18° C. (dT=18° C.).

When the amount dT at the point A is found, it is understood that the temperature $T_A$ at the point A is reduced by 18° C. compared to the set temperature $T_S$ so long as the set temperature $T_S$ is maintained at a current value.

Accordingly, in the method of manufacturing an electrode for a secondary battery according to one embodiment of the present invention, a modified set temperature $T_{Sa}$(($T_S$+18° C.) is set by adding the amount dT to the set temperature $T_S$.

With such a setting of the set temperature $T_{Sa}$, the temperature of a hot gas is prevented from being reduced by evaporative latent heat of a solvent compared to the set temperature $T_S$ thus preventing decrease in drying efficiency.

Since the map information changes according to a coating weight and a solid fraction of the paste 6a, it is preferable to prepare different pieces of map information depending on specification of the paste 6a used in manufacture of an electrode for a secondary battery.

In this embodiment, the map information expressing the correlation between the temperature $T_B$ and the temperature $T_C$ and the amount dT at the point A is acquired in advance, and the amount dT is calculated using the map information. However, the amount dT may be calculated by directly performing an arithmetic calculation based on the result of measurement of the temperature $T_B$ and the temperature $T_C$ without using map information.

A method of controlling an output to the heater 10 by the control device 5 is described with reference to FIG. 5(a) and FIG. 5(b).

Figure 5A:
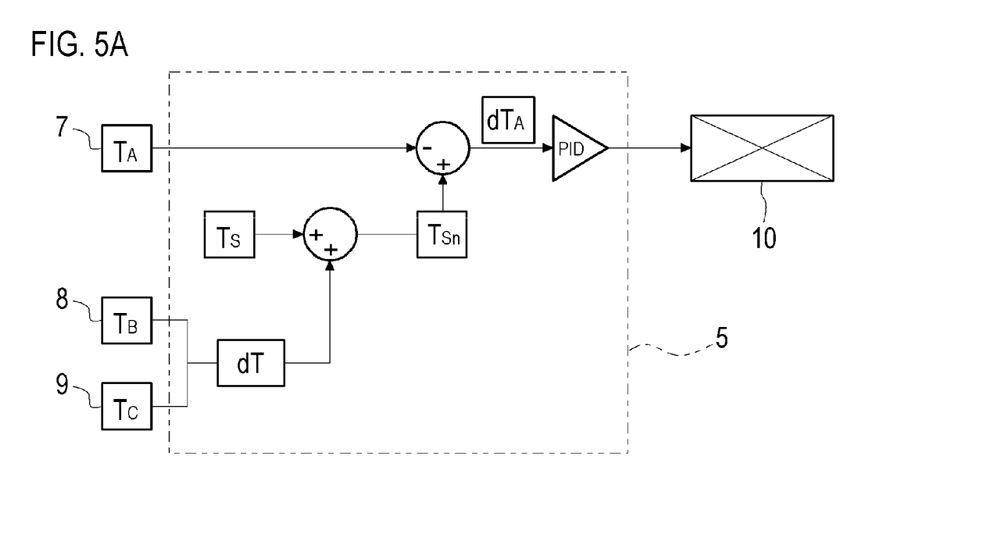
Figure 5B:
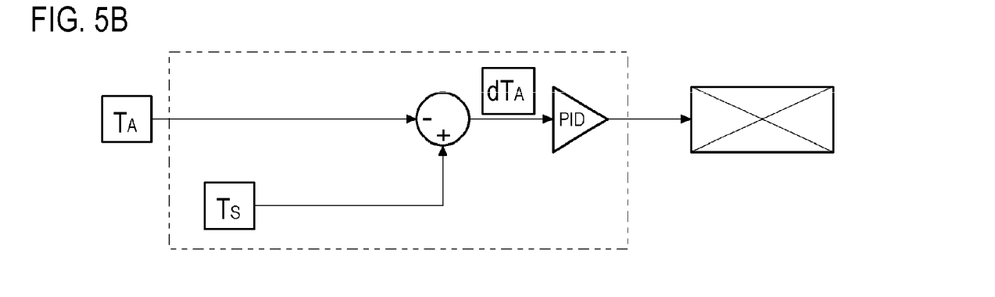

For example, conventionally, as shown in FIG. 5(b), a controlled variable $dT_A$ is directly calculated based on the difference between the temperature $T_A$ at the point A and the set temperature. However, sensitivity is low with respect to the temperature $T_A$ and hence, a change in temperature due to evaporative latent heat of the paste 6a cannot be detected with high accuracy, whereby the heater 10 cannot be controlled in a stable manner.

On the other hand, according to the hot-gas drying furnace 1 which is the apparatus for manufacturing a secondary battery according to one embodiment of the present invention, as shown in FIG. 5(a), the amount dT at the point A is calculated based on the temperatures $T_B$ and $T_C$ at the points B and C by the control device 5.

Then, the set temperature $T_S$ is modified by taking into account the calculated amount dT thus calculating the modified set temperature $T_{Sa}$, and a controlled variable $dT_A$ is calculated based on the difference between the modified set temperature $T_{Sa}$ and the temperature $T_A$ at the point A.

With such a structure, the amount dT of decrease in the temperature caused by the evaporative latent heat of the paste 6a can be taken into consideration and hence, the responsiveness in the control of the heater 10 can be improved.

Further, in the hot-gas drying furnace 1 which is the apparatus for manufacturing a secondary battery according to one embodiment of the present invention, the map information (see FIG. 4) is stored in the control device 5 in advance, and the set temperature $T_S$ is modified based on the amount dT calculated using the map information.

Specifically, in the method of manufacturing an electrode for a secondary battery according to one embodiment of the present invention, a value ($T_S$+dT) obtained by adding the amount dT to the set temperature $T_S$ of the temperature $T_A$ is set as the new set temperature $T_{Sa}$.

Then, an output to the heater 10 which constitutes a means for heating a hot gas is adjusted by the control device 5 (specifically, an indication regulator provided to the control device 5) based on the difference $dT_A$ between the new set temperature $T_{Sa}$ and the temperature $T_A$ at the point A.

Next, the overall structure of the apparatus for manufacturing an electrode for a secondary battery according to a second embodiment of the present invention is described with reference to FIG. 6, FIG. 7(a) and FIG. 7(b).

Figure 6:
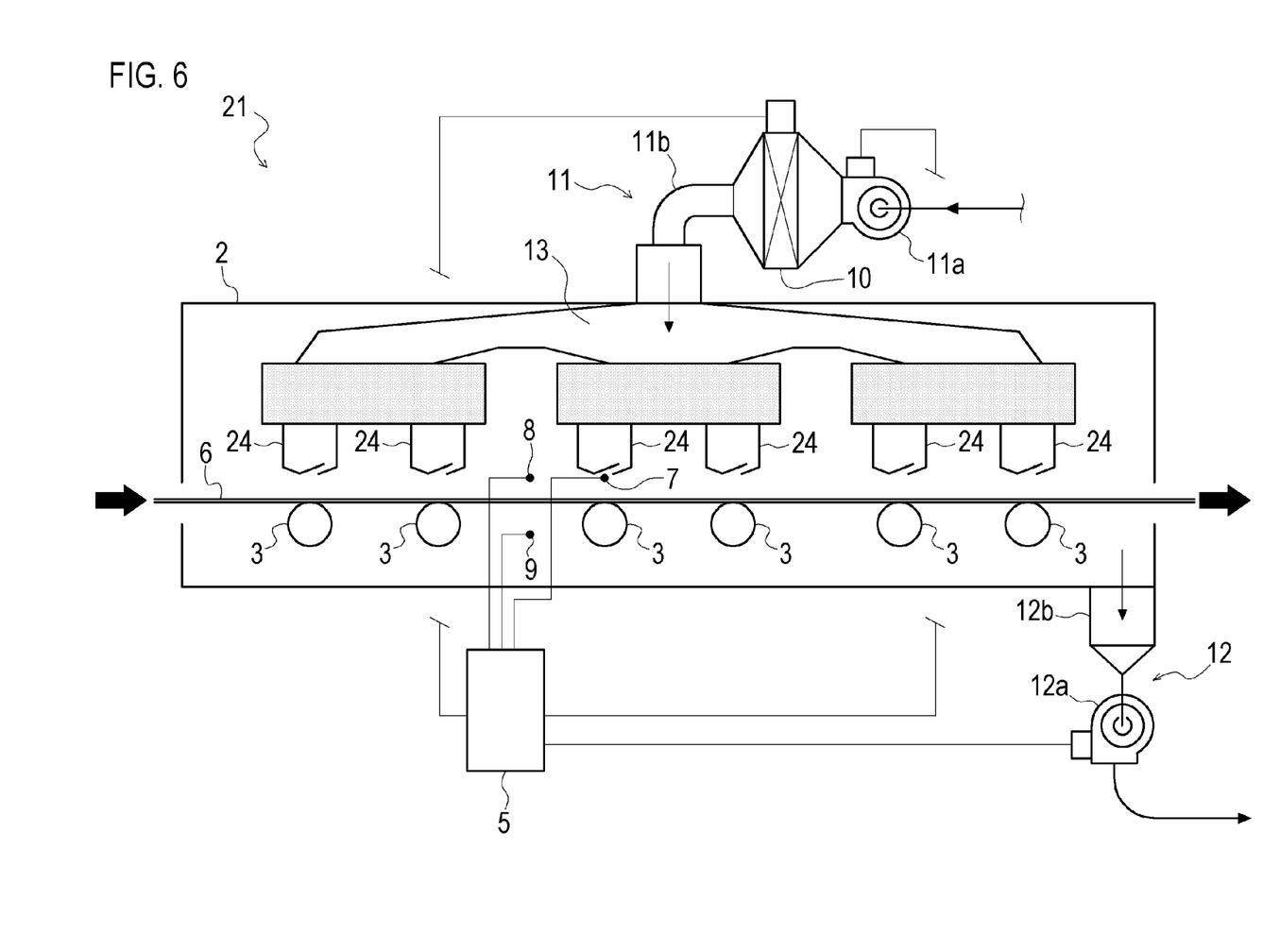
FIG. 6 is a schematic view showing the overall structure of an apparatus (hot-gas drying furnace) for manufacturing an electrode for a secondary battery according to a second embodiment of the present invention.

As shown in FIG. 6, a hot-gas drying furnace 21 which is the apparatus for manufacturing an electrode for a secondary battery according to the second embodiment of the present invention is used in the drying step (see FIG. 1) in the step of manufacturing the electrode for the secondary battery, and includes the furnace body 2, the plurality of conveying rollers 3, a plurality of nozzles 24, and the control device 5.

In other words, the hot-gas drying furnace 21 according to the second embodiment differs from the hot-gas drying furnace 1 according to the first embodiment with respect to the structure of the equipped nozzles and is substantially similar to the hot-gas drying furnace 1 with respect to other structures.

Figure 7A:
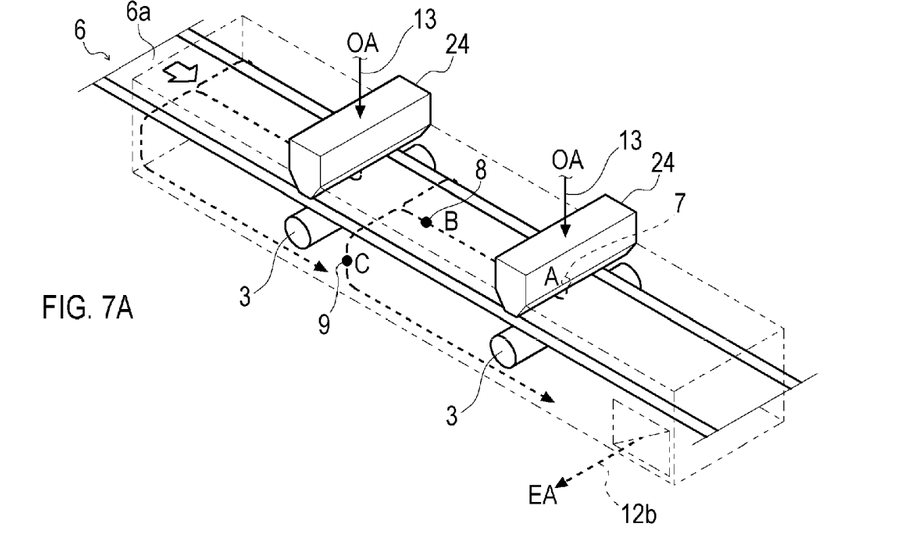
Figure 7B:
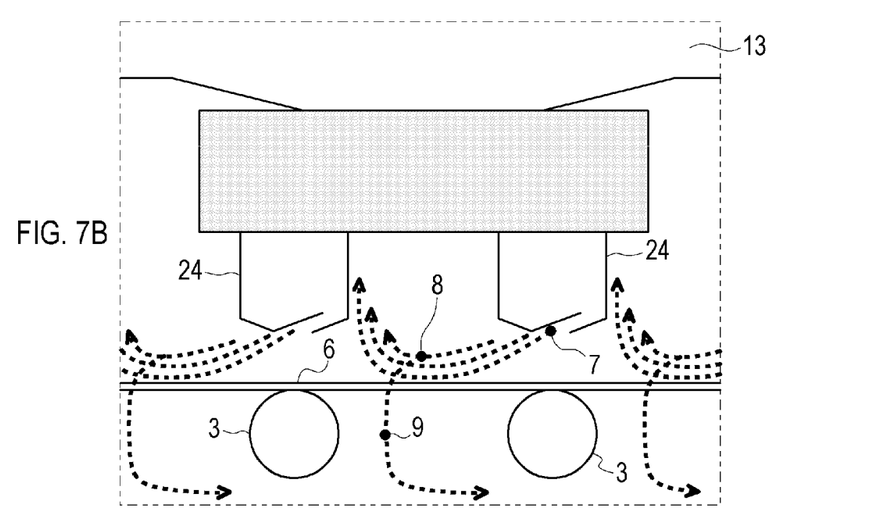

As shown in FIG. 7(a) and FIG. 7(b), the nozzle 24 is configured to emit a hot gas in only one direction, namely, in the direction toward an upstream side with respect to the conveyance direction of the collector sheet 6.

As shown in FIG. 7(a) and FIG. 7(b), the hot gas emitted through the nozzle 24 flows along the surface of the collector sheet 6 (i.e., the paste 6a) and, thereafter, part of the hot gas turns around the collector sheet 6 and flows toward a backside of the collector sheet 6 and, thereafter, the hot gas flows in the direction toward an end of the hot-gas drying furnace 1 where the gas exhaust duct 12b is connected.

Other part of the hot gas which flows along the surface of the collector sheet 6 (i.e., the paste 6a) flows in such a manner that the hot gas collides with a hot gas emitted through another nozzle 24 disposed adjacent to the nozzle 24 and whirls and hence, there are places in the inside of the furnace body 2 where the hot gas is formed into a turbulent flow.

In the hot-gas drying furnace 21, a hot gas is emitted in one direction through the nozzle 24 and hence, a distance from a point where the hot gas is emitted through the nozzle 24 to a point where the emitted hot gas collides with another hot gas emitted through another nozzle 24 is large compared to a corresponding distance of the hot-gas drying furnace 1.

Accordingly, in the hot-gas drying furnace 21, a range of a portion where the hot gas emitted through the nozzle 24 flows in a laminar state is wide compared to a corresponding range of the hot-gas drying furnace 1. Particularly, it is easy to provide an enough distance between a point A and a point B. Accordingly, the hot-gas drying furnace 21 has an advantageous effect that the amount dT at the point A can be calculated with higher accuracy.

Next, the advantageous effect acquired by applying the hot-gas drying furnace according to one embodiment of the present invention is described with reference to FIG. 8.

Figure 8:
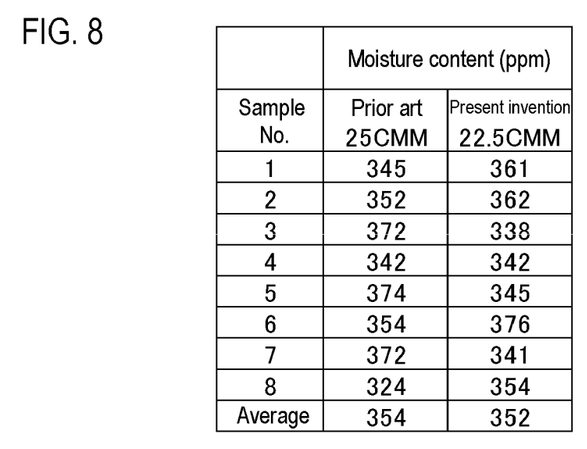
FIG. 8 shows a result of an experiment for confirming an advantageous effect acquired by applying the hot-gas drying furnace according to the one embodiment of the present invention.

FIG. 8 shows a result of an experiment where a residual amount of a solvent in a laminated layer after drying in a case where the conventional hot-gas drying furnace (having a large amount of gas) is used and a residual amount of a solvent in a laminated layer after drying in a case where the hot-gas drying furnace 1 according to the first embodiment of the present invention is used are compared.

In this experiment, the amount of gas in the conventional hot-gas drying furnace is set to 25 m$^3$/min, and the amount of gas in the hot-gas drying furnace 1 according to the first embodiment of the present invention is set to 22.5 m$^3$/min.

In other words, in the hot-gas drying furnace 1 according to the first embodiment of the present invention, the amount of gas is decreased by 10% compared to the amount of gas in the conventional hot-gas drying furnace.

Further, the slit width of the outlet formed in the nozzle 4 is set to 5 mm, and the amount of gas from the gas supply fan 11a and the amount of gas from the gas exhaust fan 11b are adjusted by the control device 5 so as to set a flow rate of a hot gas blown through the nozzle 4 to 22.5 m/s.

The number of nozzles 4 disposed in the furnace is set to 6.

Further, a furnace length of the hot-gas drying furnace 1 is set to 6 m, a conveyance speed of the collector sheet 6 in the inside of the hot-gas drying furnace 1 is set to 30 m/min, and a drying time is set to 12 seconds.

In other words, in the hot-gas drying furnace 1, a time from a point of time when the collector sheet 6 is introduced into the furnace body 2 to a point of time when the collector sheet 6 is discharged is set to 12 seconds. The paste 6a is dried so that the amount of a solvent contained in the paste 6a is reduced to a value equal to or smaller than a predetermined standard value during these 12 seconds.

The structure of a workpiece to be dried by the hot-gas drying furnace 1 is described. In the workpiece, Copper foil is used as the collector sheet 6, and a paste formed by using, as a main component, graphite which is a negative electrode active substance is used as the paste 6a.

A solid fraction of the paste 6a is set to 50%, and a coating weight of the paste 6a is set to 8 mg/cm$^2$.

Some workpieces are dried using the conventional hot-gas drying furnace and other workpieces are dried using the hot-gas drying furnace 1 and, thereafter, the residual amounts of the solvent (water) are evaluated by calculating the moisture contents (ppm) by the Karl-Fischer method.

8 pieces of sample are prepared for each of the conventional hot-gas drying furnace and the hot-gas drying furnace 1 (16 pieces in total), and the result of measurement of the moisture contents of these samples is shown in FIG. 8.

According to the result of the experiments shown in FIG. 8, when the result of a case where the conventional hot-gas drying furnace is used and the result of a case where the hot-gas drying furnace 1 according to the first embodiment of the present invention is used are compared, no significant difference is recognized in average values and irregularities of the moisture contents after drying.

In other words, from the result of the experiment shown in FIG. 8, it is confirmed that, with the use of the hot-gas drying furnace 1 according to the first embodiment of the present invention, while reducing the amount of gas by 10% compared to the amount of gas of the conventional hot-gas drying furnace, it is possible to maintain a drying efficiency substantially similar to the drying efficiency in a case where the conventional hot-gas drying furnace is used.

The method of manufacturing an electrode for a secondary battery according to one embodiment of the present invention is a method of manufacturing an electrode for a secondary battery using the hot-gas drying furnace 1 or 21. The hot-gas drying furnace 1 or 21 includes the conveying rollers 3 for conveying, web handling, the collector sheet 6 to which the paste 6a is applied, the nozzles 4 or the nozzles 24 for emitting the hot gas which is a heated gas (air in the present embodiment) onto the paste 6a, the gas supply fan 11a and the gas supply duct 11b for supplying the hot gas to the nozzles 4 or the nozzles 24, the heater 10 for heating air to be supplied to the nozzles 4 or the nozzles 24, which is disposed in the gas supply duct 11b, the control device 5 for adjusting the output of the heater 10, and the gas exhaust fan 12a and the gas exhaust duct 12b for discharging the hot gas emitted through the nozzles 4 or the nozzles 24. The method includes the step of measuring, using the first temperature sensor 7, the temperature $T_A$ of the hot gas at the point A as the first position which is the blowing position of the nozzle 4 or the nozzle 24, the step of measuring, using the second temperature sensor 8, the temperature $T_B$ of the hot gas at the point B as the second position which is a flow area of the hot gas blown through the nozzle 4 or the nozzle 24, the point B being situated downstream of the point A in the flow direction of the hot gas blown through the nozzle 4 or the nozzle 24, the step of measuring, using the third temperature sensor 9, the temperature $T_C$ of the hot gas at the point C as the third position which is a flow area of the hot gas blown through the nozzle 4 or the nozzle 24, the point C being situated downstream of the point B in the flow direction of the hot gas blown through the nozzle 4 or the nozzle 24, the step of calculating, using the control device 5, the amount dT of decrease in the temperature of the hot gas at the point A caused by the evaporative latent heat of the paste 6a based on the temperature $T_B$ measured by the second temperature sensor 8 and the temperature $T_C$ measured by the third temperature sensor 9, the step of adding, using the control device 5, the calculated amount dT to the set temperature $T_S$ of the hot gas at the point A to calculate the modified set temperature $T_{Sa}$ of the hot gas at the point A, and the step of adjusting, using the control device 5, the output of the heater 10 depending on the difference $dT_A$ between the modified set temperature $T_{Sa}$ of the hot gas and the temperature $T_A$ measured by the first temperature sensor 7.

In the method according to one embodiment of the present invention, the control device 5 has the map information on a correlation acquired in advance between the amount dT of decrease in the temperature of the hot gas at the point A caused by the evaporative latent heat of the paste 6a, and the temperature $T_B$ of the hot gas at the point B and the temperature $T_C$ of the hot gas at the point C. The control device 5 calculates, using the map information, the amount dT of decrease in the temperature of the hot gas at the point A based on the temperature $T_B$ measured by the second temperature sensor 8 and the temperature $T_C$ measured by the third temperature sensor 9.

The hot-gas drying furnace 1 or 21 according to one embodiment of the present invention includes the conveying rollers 3 for conveying, by web handling, the collector sheet 6 to which the paste 6a is applied, the nozzles 4 or the nozzles 24 for emitting the hot gas which is a heated gas (air in the present embodiment) to be blown onto the paste 6a, the gas supply fan 11a and the gas supply duct 11b for supplying the hot gas to the nozzle 4 or the nozzle 24, the heater 10 for heating air to be supplied to the nozzle 4 or the nozzle 24, which is disposed in the gas supply duct 11b, the control device 5 for adjusting the output of the heater 10, the gas exhaust fan 12a and the gas exhaust duct 12b for discharging the hot gas emitted through the nozzle 4 or the nozzle 24, the first temperature sensor 7 for detecting the temperature $T_A$ of the hot gas at the point A as the first position which is a blowing position of the nozzle 4 or the nozzle 24, the second temperature sensor 8 for detecting the temperature $T_B$ of the hot gas at the point B as the second position which is a flow area of the hot gas emitted through the nozzle 4 or the nozzle 24, the point B being situated downstream of the point A in the flow direction of the hot gas emitted through the nozzle 4 or the nozzle 24, and the third temperature sensor 9 for detecting the temperature $T_C$ of the hot gas at the point C as the third position which is a flow area of the hot gas emitted through the nozzle 4 or the nozzle 24, the point C being situated downstream of the point B in the flow direction of the hot gas emitted through the nozzle 4 or the nozzle 24. The control device 5 is connected to the first, second and third temperature sensors 7, 8 and 9. The control device 5 has the map information on a correlation acquired in advance between the amount dT of decrease in the temperature of the hot gas at the point A caused by the evaporative latent heat of the paste 6a, and the temperature $T_B$ of the hot gas at the point B and the temperature $T_C$ of the hot gas at the point C. The control device 5 calculates, using the map information, the amount dT of decrease in the temperature of the hot gas at the point A based on the temperature $T_B$ measured by the second temperature sensor 8 and the temperature $T_C$ measured by the third temperature sensor 9. The control device 5 adds the calculated amount dT to the set temperature $T_S$ of the hot gas at the point A to calculate the modified set temperature $T_{Sa}$ of the hot gas at the point A. The control device 5 adjusts the output of the heater 10 depending on the difference $dT_A$ between the modified set temperature $T_{Sa}$ of the hot gas and the temperature $T_A$ measured by the first temperature sensor 7 in order to control the temperature $T_A$ of the hot gas at the point A.

Due to such structures, it is possible to reliably prevent a temperature $T_A$ of the hot gas from exceeding an allowable upper-limit temperature of a workpiece (in the present embodiment, the paste 6a) while reducing the amount of the hot gas.

Accordingly, a cost required to manufacture a secondary battery can be reduced while reducing an air conditioning load.

INDUSTRIAL APPLICABILITY

The present invention is widely applicable not only to a hot-gas drying furnace for manufacturing a secondary bat-tery but also to a hot-gas drying furnace used in a step of drying a paste applied in a film shape. For example, the present invention is applicable as a technique for manufacturing semiconductor parts or the like.

REFERENCE SIGNS LIST

1: hot-gas drying furnace (first embodiment)
4: nozzle (first embodiment)
5: control device
6: collector sheet
6a: paste
7: temperature sensor
8: temperature sensor
9: temperature sensor
10: heater
11a: gas supply fan
11b: gas supply duct
21: hot-gas drying furnace (second embodiment)
24: nozzle (second embodiment)

The invention claimed is:
1. A method of manufacturing an electrode for a secondary battery using a hot-gas drying furnace, the hot-gas drying furnace including:
a conveying roller for conveying a collector sheet to which a paste for the electrode is applied;
a nozzle for blowing a hot gas which is a heated gas onto the paste;
a gas supply fan and a gas supply duct for supplying the hot gas to the nozzle;
a heater for heating the gas to be supplied to the nozzle, which is disposed in the gas supply duct;
a control device for adjusting an output of the heater;
first, second and third temperature sensors, wherein
the second temperature sensor is disposed upstream of the nozzle with respect to a conveyance direction of the collector sheet and above the collector sheet,
the third temperature sensor is disposed upstream of the nozzle with respect to the conveyance direction of the collector sheet and below the collector sheet, the method comprising:
conveying the collector sheet in the conveyance direction;
applying the paste for the electrode onto the collector sheet;
blowing the hot gas in a flow direction onto the paste, wherein the flow direction is toward an upstream side with respect to the conveyance direction of the collector sheet;
a step of measuring, using the first temperature sensor, a temperature of the hot gas at a first position which is a blowing position of the nozzle;
a step of measuring, using the second temperature sensor, a temperature of the hot gas at a second position which is within a flow area of the hot gas blown through the nozzle, the second position being situated downstream of the first position in the flow direction of the hot gas blown through the nozzle, and disposed at a position above the collector sheet;
a step of measuring, using the third temperature sensor, a temperature of the hot gas at a third position which is within the flow area of the hot gas blown through the nozzle, the third position being situated downstream of the second position in the flow direction of the hot gas blown through the nozzle, and disposed at a position below the collector sheet;
a step of calculating, using the control device, an amount of decrease in temperature of the hot gas at the first position caused by evaporative latent heat of the paste based on the temperature of the hot gas measured by the second temperature sensor and the temperature of the hot gas measured by the third temperature sensor;

a step of adding, using the control device, the calculated amount to a set temperature of the hot gas at the first position to modify the set temperature of the hot gas at the first position;

and a step of adjusting, using the control device, the output of the heater depending on a difference between the modified set temperature of the hot gas and the temperature of the hot gas measured by the first temperature sensor.

2. The method according to claim 1, wherein the control device has map information on a correlation acquired in advance between the amount of decrease in temperature of the hot gas at the first position caused by the evaporative latent heat of the paste, and the temperature of the hot gas at the second position and the temperature of the hot gas at the third position, and the control device calculates, using the map information, the amount of decrease in temperature of the hot gas at the first position based on the temperature of the hot gas at the second position measured by the second temperature sensor and the temperature of the hot gas at the third position measured by the third temperature sensor.

3. The method according to claim 1, wherein

The first second and third temperature sensors measure a temperature of the hot gas blown through the nozzle, wherein the hot gas has a shortest flow passage length from the heater.

* * * * *